United States Patent [19]

Anderson

[11] 4,039,438
[45] Aug. 2, 1977

[54] BIOLOGICAL DENITRIFICATION OF WATER

[76] Inventor: Donald R. Anderson, 3062 Blume Drive, Los Alamitos, Calif. 90720

[21] Appl. No.: 622,528

[22] Filed: Oct. 15, 1975

[51] Int. Cl.$^2$ ................................................ C02C 5/10
[52] U.S. Cl. ...................................... 210/11; 210/16; 210/17; 210/18; 210/DIG. 28
[58] Field of Search ................... 210/2, 11, 16, 17, 18, 210/14, 12, 8, 62, 63, DIG. 28, 64; 162/4, 6, 5; 195/33

[56] References Cited

U.S. PATENT DOCUMENTS

| 1,933,227 | 10/1933 | Snyder et al. | 162/6 |
|---|---|---|---|
| 2,528,403 | 10/1950 | West | 210/11 |
| 3,574,098 | 4/1971 | Boorujy | 210/62 |
| 3,709,364 | 1/1973 | Savage | 210/11 |
| 3,778,349 | 12/1973 | Carta | 195/33 |

OTHER PUBLICATIONS

Beck et al.; "Methods of Removing Nitrates from Water", J. Agr. Food Chem.; vol. 18, No. 5, (1970), pp. 785-788.

*Primary Examiner*—Thomas G. Wyse
*Assistant Examiner*—Benoit Castel
*Attorney, Agent, or Firm*—Fulwider, Patton, Rieber, Lee & Utecht

[57] ABSTRACT

There is disclosed a process for biological denitrification of nitrate containing waters, particularly agricultural drain waters, sewage effluents, ground waters and the like by contacting the water with a solid cellulosic substrate comprised chiefly of paper or paper pulp in the presence of anaerobic bacteria in an active growth phase to reduce the nitrate content of the water by biological oxidation of the substrate.

11 Claims, No Drawings

BIOLOGICAL DENITRIFICATION OF WATER

BACKGROUND OF THE INVENTION

1. Field of the Invention

This invention relates to the denitrification of water and, in particular, relates to a process for the biological denitrification of agricultural drain waters, sewage effluents, ground waters and the like.

2. Brief Statement of the Prior Art

The intensive use of nitrogenous fertilizers to achieve spectacular gains in agricultural production has resulted in the run-off of substantial quantities of nitrogen in the form of nitrates to surrounding rivers, lakes and oceans. The problem encountered with dissolved nitrogen compounds in all wastewaters is particularly acute in irrigated lands in arid and semiarid regions of the country. Irrigated lands must, periodically, be flushed with large quantities of water to remove salts that otherwise accumulate in the soil. The resultant agricultural drain waters, which are collected in subterranean drainage channels, must be separately collected and processed since their relatively high content of dissolved salts, and in particular, nitrates, renders them unfit for returning to the surrounding watershed.

Sewage effluents are also high in nitrogen compounds which are readily converted into nitrates which when discharged into streams, lakes and ground water basins makes them unfit for other beneficial uses. Additionally, some groundwaters are already contaminated with nitrates and require some form of treatment before use.

Various techniques have, in the past years, been proposed for the removal or reduction of the nitrates in waters. Some methods have proposed the use of ion exchange resins. While ion exchange resins are operative for this purpose, their high initial and operational costs renders this technique unsuited for an ecconomical solution of the problem.

Separate proposals have been made for the biological reduction of the nitrate content of water by the use of anaerobic bacteria. Since the waste waters commonly contain a relatively low organic content, typically less than about 5 parts per million, these waters have insufficient energy source to support growth of adequate quantities of anaerobic bacteria for any substantial reduction in the nitrate content of the water. Accordingly, various materials have been suggested as suitable to add to the waters for support of the growth of the anaerobic bacteria. Among such suggestions are liquids such as methanol or acetic acid. Another suggestion, in U.S. Pat. No. 3,829,377, is to add methane or a gaseous hydrocarbon as the food source for the bacteria. In this method a gaseous hydrocarbon such as methane is continuously passed through the water to maintain the water saturated with the gas during its residence in the bacterial zone.

The aforedescribed techniques are not ideally suited to the most ecconomical and practical solution of the problem for various reasons. The use of miscible liquids such as methanol or acetic acid presents a residual purification problem since excess quantities of the energy source will remain in the treated water, resulting in a pollution problem which may be as severe as the nitrate contaminants desired to be removed. Additionally, these liquids are industrial chemicals in demand for other purposes and, hence, costly for use in the denitrification process. Substitution of methane for methanol or acetic acid does not entirely obviate these problems.

While the use of a gaseous material does not present a potential contamination problem, the gases must be continuously recycled through the water to maintain its saturation during treatment, thereby requiring expenditure of substantial amounts of energy, in addition to the energy source, such as methane, consumed by the bacteria.

Ideally, the denitrification process should utilize, as the food source for anaerobic bacteria, a material which does not impose a burdensome demand for expensive industrial chemicals and energy sources. In some instances, the process could find commercial applications by using as the biological energy source a material which is a waste product of the society and disposal of such material is achieved concurrently with the restoration of waste waters to ecologically acceptable standards. Such a technique would also avoid consumption of energy sources such as methane or petrochemicals such as methanol and acidic acid which are already experiencing excessive demand in an energy limited society.

BRIEF DESCRIPTION OF THE INVENTION

This invention comprises the biological denitrification of waters containing from 10 to about 250 parts per million (ppm.) and typically from 15 to about 50 ppm. of nitrogen as nitrate and an insufficient quantity of organic material to support the necessary anaerobic bacterial action for effecting reduction of any substantial quantities of the nitrate content. Typically, the amount of organic material in the water is less than about 10 ppm. and, generally, less than about 2 ppm.

The invention comprises the contacting of the aforedescribed water with a solid substrate usually a cellulosic material comprised chiefly of paper, or paper pulp, in the presence of an anaerobic bacterial culture with sufficient time and favorable growth conditions to permit the anaerobic bacteria to undergo an active growth phase and effect reduction of the nitrate content of the water. This process can thereby solve two ecological problems; it can provide a disposal for waste paper such as newsprint and the like and also effects the reduction of nitrate in waste waters sufficiently to permit reuse and/or return of the water to the surrounding watershed.

DESCRIPTION OF PREFERRED EMBODIMENTS

The invention is preferably applied to the denitrification of agricultural drain waters which are usually collected in subterranean drains beneath irrigated soil. The drain waters are usually collected during the periodic leaching of the irrigated lands with an excess of water to remove and prevent the accumulation of salts in the soil to levels that would inhibit plant growth. Since the water is passed through a substantial depth of soil before it is collected in the drainage canals and the like, the water is relatively free of any suspended material and organic matter and its major contaminants are the dissolved salts, chiefly dissolved nitrogen in the form of soluble nitrates. The amount of organic material present in the water that could support bacterial growth is less than about 5 ppm. and generally less than about 1.5 ppm. The nitrogen compounds in the water are chiefly soluble nitrates since any ammonicial nitrogen compounds are rapidly converted to nitrates by soil bacteria. Typically, the nitrates are present as soluble contaminants in the drain waters in amounts from 10 to about 200 ppm., generally from about 15 to about 50 ppm.

Waters collected in open surface drains, generally as run-off during irrigation or periods of rainfall, contain lesser quantities of dissolved nitrates, typically from 5 to about 100 ppm. Soluble phosphates, typically orthophosphates, are also leached from the soil by the agricultural drain waters and are present in these waters in amounts from about 0.1 to about 2 ppm. phosphorous as orthophosphate.

Other waters which can be treated to reduce their nitrogen content include effluents from sewage plants which have high contents of nitrogen compounds that readily form nitrates and can render bodies of water which receive the discharged effluent from the sewage plant unfit for use. The sewage treatment substantially eliminates all organic matter from the effluent and, accordingly this water, also, lacks an adequate biological energy source for anaerobic nitrate reduction.

Most of the waters to be treated by the process contain all the elements for supporting a bacterial culture except the necessary organic energy source for such growth. Typically, the organic material required for denitrification comprises from 1.5 to about 5 times the nitrogen weight concentration and the organic energy requirements for biological denitrification of the water containing the aforedescribed quantities of nitrogen are from 10 to about 1,000 ppm.; quantities far in excess of the trace quantities of organic material which are present in the drain waters. In some instances, however, small amounts of phosphate can be added to support biological growth.

The water under treatment, e.g., agricultural drain waters, can be collected and passed to a central treating facility where the water can be subjected to the biological denitrification. At the end of the treatment, the water is decanted or filtered from the body of water undergoing treatment to separate any suspended quantities of the cellulosic material. Generally, the bacterial culture will be occluded or adsorbed on the cellulosic material and the water will be obtained therefrom in a relatively high purity, suitable for use and/or return to the watershed. In some instances some residual quantities of bacteria may be present in the water. In most instances, the bacteria are non-pathogenic and the trace or minor amounts of bacteria will not be objectionable to further uses of the water. If however, the water is to meet very high purity standards, the water can be readily treated by chemicals such as ozone or chlorine and the like, or by ultraviolet radiation to destroy any residual quantities of bacteria.

The agricultural drain water typically contains bacteria which will readily adapt to growth under anaerobic conditions with a cellulosic food source and effect denitrification of the water. The useful bacteria are those which are capable of undergoing growth under anaerobic or substantial anaerobic conditions. The bacteria are anaerobes of facultative aerobes capable of existing under anaerobic and facultative aerobic bacteria.

Once the treatment process has been started, the necessary culture of anaerobic bacteria will reside in the bacterial zone or treatment vessel and it will not be necessary to innoculate the water with any additional quantities of bacteria. The agricultural waters, as previously mentioned, typically contain trace quantities of these bacteria which will multiply into adequate quantities for the processing if the water is held for adequate time in presence of the cellulosic food source. This time period of the necessary growth phase can, if desired, be substantially reduced by the innoculation of the water, initially, with a bacteria culture such as that obtained from soil samples.

The following are examples of anaerobic, facultative aerobic and facultative anaerobic bacteria which are capable of use in the invention. Such bacteria include the genous Thiobacillus such as *Thiobacillus denitrificans,* etc.; Pseudomonas, such as *Pseudomonas viscosa, Pseudomonas ureae, Pseudomonas denitrificans, Pseudomonts petasites, Pseudomonas polycolor, Pseudomonas seminum, Pseudomonas xanthochlora, Pseudomonas castaneae,* etc.; Chromobacters, such as *Chromobacterium amethystinum, Chromobacterium voleceum,* etc.; Bacillus, such as *Bacillus michaelisii, Bacillus edgeworthiae Bacillus nitroxus,* etc.; and Clostridium, such as *Clostridium viscifaciens, Clostridium acetobutylicum, Clostridium felsineum,* etc.

The solid usually cellulosic material used as the organic energy source for the bacteria can, in general, comprise any new or waste cellulosic material such as pulp which can be raw pulp such as supplied to the paper industry or can be a waste cellulosic material, e.g., straw, wastepaper and the like. These materials can be used directly in the process, shredded to facilitate swelling and disintegration into a pulp when contacted by the water. When wastepaper is used, the paper can be pretreated by washing and contacting with aqueous solvents for the removal of ink, pigments, clays, sizing agents, and the like, customarily coated on paper to improve its strength and surface texture. Such treatment can be any conventional treatment for the production of a relatively pure cellulosic pulp from the paper, used in recovery and recycling of cellulosic values of paper.

The biological denitrification of the drain water is carried out under the proper conditions for the culture of anaerobes employed. Generally, temperatures from 50° to 120° C. and preferably from 70° to 90° F. are employed. Ambient or atmospheric pressures can be used and the process is conducted in a suitable vessel or enclosed pond and the like to insure anaerobic conditions.

The water is contacted with the cellulosic material in the presence of the culture of anaerobic bacteria for a sufficient time to obtain a substantial reduction in the nitrate content of the water. The degree of reduction of nitrate content of the water depends on the initial nitrate content of the water supplied to the treatment steps, the activity and concentration of the bacteria in the bacterial zone. Suitable levels of nitrate content for the treated water that would permit the water to be used directly as potable water or for the addition to the watershed would be from one to about 20, preferably from 2 to about 10 ppm. nitrogen as nitrate. Accordingly, the degree of denitrification, i.e., reduction in nitrate content, will be at least about 50 and, preferably, at least about 70 percent and in some instances from 90 to 95 percent.

The process is conducted under anaerobic conditions in a suitable vessel, pond and the like which will provide a sufficient volume for the necessary residence time of the denitrification process. Examples of various facilities include covered ponds, reaction vessels, submerged drain tiles and the like in which the solid cellulosic waste material can be supplied to replenish that utilized by the bacteria and in which the water can be slowly introduced to flow through the biological reaction zone. The volume of the biological reaction zone must be sufficient to provide the necessary residence time to effect the desired denitrification. Generally, the residence time necessary for effecting a substantial reduction in nitrate content will range from a few minutes to about 24 hours. The waters treated will frequently contain sulfates which will be reduced to hydrogen sulfide if the anaerobic process is conducted for an excessive time. This does not occur to any significant extent in the presence of nitrates which are preferentially reduced by the bacteria. Accordingly, the residence time should be sufficient for the desired nitrate reduction but insufficient for sulfate reduction, and excess residence time can be readily observed by hydrogen sulfide emission.

The solid cellulosic material also serves as a surface for supporting the growth of the bacteria and for retention of the bacteria in the denitrification zone. Bacteria can be removed from the denitrification zone continuously or periodically by the removal of a portion of the cellulosic material contained in this zone and can be recovered by suitable steps to obtain a high proteinaceous solid suitable as an animal feed supplement.

The bacteria that are removed with the denitrified water can be readily killed by conventional techniques such as the addition of chemicals including chlorine or ozone to the water, e.g., the addition of chlorine in quantities such as from 0.1 to about 5 ppm. will effectively kill the bacteria. Similar results can be achieved by the addition of the same quantities of ozone. Radiation of the water with ultraviolet light will also kill the bacteria by the exposure of the bacteria to approximately 40,000 ergs per square centimeter. A typical example of suitable treatment comprises a low pressure mercury vapor lamp, 30 watt capacity which produces about 800 ergs per square centimeter per second and an exposure time of about 2 minutes.

The following example will illustrate a mode of practice of the invention and serve to demonstrate results obtainable thereby.

EXAMPLE

The denitrification of water was conducted in laboratory apparatus including two reaction vessels of 140 milliliters capacity. Small volume displacement pumps were employed to circulate water through the reactors at flow rates up to 5 milliliters per minute. Newspaper was shredded and placed in the reaction flasks. The water employed for the reaction was tap water to which sodium nitrate was added to provide a concentration of nitrate in the water of 20 milligrams per liter. The solutions were also provided with a phosphorous source by the addition of 2 milligrams per liter of phosphorous, added as sodium orthophosphate.

The bacterial culture was developed in the reactor by circulating the test solution through the reactor at a rate of 1 milliliter per minute for a period of about 4 months. Thereafter the reactor was operated at controlled flow rates over test periods which included sampling and analyzing of the effluent water for dissolved nitrate content using a Hach colorimiter and Hach nitraver IV test procedure. Before commencing the test, hydrogen sulfide was stripped from the samples by purging the samples with air. The reactors were also observed for any hydrogen sulfide emission and a record was made if detectable amounts of hydrogen sulfide were formed.

Significant reduction of the nitrate content of the water was achieved with hydrogen sulfide evolution at a rate that was observed to decrease with increasing flow rate. The following table tabulates the results observed during the testing period:

Table I

| Test Day | Flow Rate | Effluent Nitrate Content | $H_2S$ Detected |
|---|---|---|---|
| 1 | 0.125 ml./min. | 0.75 ppm. | yes |
| 2 | 0.250 | 0.75 | Yes |
| 3 | 0.250 | 1.20 | Yes |
| 4 | 0.50 | 0.75 | Yes |
| 6 | 0.50 | 0.65 | Slightly |
| 7 | 0.50 | 0.65 | Slightly |

On the 8th day of the testing the second reaction flask was included in the test with the flow being divided into equal portions for parallel flow through the two reaction flasks. The results obtained during the succeeding testing are set forth in the following table:

Table II

| Test Day | Flow Rate | Effluent Nitrate Content | $H_2S$ Detected |
|---|---|---|---|
| 8 | 1.00 ml./min. | 4.75 ppm. | No |
| 9 | 1.00 | 7.00 | No |
| 10 | 1.00 | 4.50 | No |
| 11 | 1.00 | 4.50 | No |
| 12 | 1.00 | 4.30 | No |
| 13 | 0.75 | 1.75 | No |
| 14 | 0.75 | 2.90 | No |
| 15 | 0.75 | 2.50 | No |

The second reaction flask was then removed from the experiment and the water flow through the first reactor was continued. Test readings were taken commencing with the 22nd day of the test period and continued for a period of 3 days during which the effectiveness of the reaction flask diminished rapidly, indicating depletion of the cellulose in the flask. These data are set forth in the following table:

Table III

| Test Day | Flow Rate | Effluent Nitrate Content | $H_2S$ Detected |
|---|---|---|---|
| 22 | 0.75 ml./min. | 0.5 ppm. | No |
| 23 | 0.75 | trace | No |
| 24-10:30 a.m. | 2.00 | 4.75 | No |
| 24- 1:15 p.m. | 2.00 | 10.00 | No |
| 24- 4:05 p.m. | 1.50 | 8.20 | No |
| 24- 7:35 p.m. | 1.50 | 9.00 | No |
| 25 | 1.00 | 8.00 | No |
| 26 | 0.75 | 8.00 | No |
| 27 | 0.75 | 8.00 | No |
| 30 | 0.50 | 9.00 | No |
| 31 | 0.25 | 8.20 | No |

The experiment was thereafter discontinued because of the apparent depletion of the cellulosic material in the reactor.

The invention has been described with regard to the presently preferred mode of practice and illustrated by laboratory experiments which confirm the effectiveness of the treatment. It is not intended that the invention be unduly limited by this disclosure of preferred embodiments and laboratory experiments. Instead, it is intended that the invention be defined by the method steps and reagents and obvious equivalents, set forth in the following claims.

What is claimed is:

1. The process for the anaerobic biological denitrification of water which comprises:

contacting water containing from 10 to about 200 ppm nitrogen as nitrate and quantities of organic material less than about 10 ppm., insufficient to support its biological denitrification, with a quantity of a cellulosic substrate sufficient to support said biological denitrification in the presence of a culture of anaerobic soil bacteria in an active growth phase; and maintaining the water during the contacting substantially free of oxygen, under anaerobic conditions, and at a temperature from 50° to about 120° F. and for a sufficient period of time from a few minutes to to about 24 hours to effect the biological denitrification of the water.

2. The process of claim 1 wherein said water is agricultural drain water also containing a trace quantity of phosphorous to support the growth of the anaerobic bacteria.

3. The process of claim 1 wherein said cellulosic substrate is waste newspaper and pulp derived therefrom.

4. The process of claim 3 including the step of shredding the waste newspaper and contacting the paper with water to remove printing ink and pigments therefrom prior to introducing the paper into the biological denitrification step.

5. The method of claim 1 wherein said water is slowly passed upwardly through a denitrification zone containing an amount of said cellulosic substrate in excess of that required for the denitrification of the water, suspended as a cellulosic pulp in said water.

6. The denitrification process of claim 5 wherein water of substantially reduced nitrate content is decanted from said suspension of cellulosic pulp.

7. The denitrification process of claim 6 wherein said anaerobic bacteria are absorbed on said cellulosic substrate and the separation of effluent water therefrom effects a substantially complete separation of water from said bacterial culture.

8. The denitrification process of claim 7 wherein said effluent water is treated to kill residual bacteria contained therein.

9. The method of claim 8 wherein said treatment comprises the addition of chlorine at a concentration of 0.1 to about 5 ppm.

10. The denitrification process of claim 9 wherein said treatment comprises the application of ultraviolet light to the water.

11. The method of claim 8 wherein said treatment comprises the addition of ozone to the water of a concentration of 0.1 to 50 ppm. therein.

* * * * *